(12) United States Patent
Simms et al.

(10) Patent No.: US 9,598,536 B2
(45) Date of Patent: *Mar. 21, 2017

(54) PROCESS FOR PREPARING HIGH MOLECULAR WEIGHT POLYMERS BY POLYMERIZING EPOXIDE MONOMERS

(71) Applicant: Dow Global Technologies LLC, Midland, MI (US)

(72) Inventors: John R. Simms, Saint Albans, WV (US); John M. Kenney, Scott Depot, WV (US); Robert S. Landon, Livingston, TX (US); Jeffrey G. Hippler, South Charleston, WV (US)

(73) Assignee: Dow Global Technologies LLC

( * ) Notice: Subject to any disclaimer, the term of this patent is extended or adjusted under 35 U.S.C. 154(b) by 26 days.

This patent is subject to a terminal disclaimer.

(21) Appl. No.: 14/371,184

(22) PCT Filed: Jan. 21, 2013

(86) PCT No.: PCT/US2013/022385
§ 371 (c)(1),
(2) Date: Jul. 9, 2014

(87) PCT Pub. No.: WO2013/116027
PCT Pub. Date: Aug. 8, 2013

(65) Prior Publication Data
US 2015/0166724 A1    Jun. 18, 2015

Related U.S. Application Data

(60) Provisional application No. 61/592,207, filed on Jan. 30, 2012.

(51) Int. Cl.
*C08G 59/68* (2006.01)
*C08G 65/04* (2006.01)
(Continued)

(52) U.S. Cl.
CPC ........... *C08G 65/10* (2013.01); *C08G 65/269* (2013.01); *C08G 65/2651* (2013.01); *C08G 65/2672* (2013.01); *C08G 65/2696* (2013.01)

(58) Field of Classification Search
CPC   C08G 65/10; C08G 65/2651; C08G 65/2672; C08G 65/269; C08G 65/2696
(Continued)

(56) References Cited

U.S. PATENT DOCUMENTS

| 1,539,650 A | 5/1925 | Dombeck |
| 2,969,402 A | 6/1961 | Hill et al. |

(Continued)

FOREIGN PATENT DOCUMENTS

| CN | 1740209 | 3/2006 |
| CN | 101392052 | 3/2009 |

(Continued)

OTHER PUBLICATIONS

Polyox Water-Soluble Resins, Dow Bulletin, 326-00001-0302, Mar. 2002.

(Continued)

*Primary Examiner* — David Karst

(57) ABSTRACT

A process for polymerizing an epoxide monomer, preferably ethylene oxide, comprising carrying out the process in the presence of a catalytically active amount of a catalyst obtainable by a preparation process comprising admixing at least one alkaline earth metal, liquid ammonia, an alkylene oxide, which is optionally substituted by aromatic radicals, and an organic nitrile having at least one acidic hydrogen atom to prepare a slurry of modified alkaline earth hexammine in liquid ammonia; continuously transferring the slurry of modified alkaline earth hexammine in liquid ammonia into a stripper vessel and continuously evaporating ammonia, thereby accumulating the modified catalyst in the strip- (Continued)

per vessel; and upon complete transfer of the slurry of modified alkaline earth hexammine into the stripper vessel, aging the modified catalyst to obtain the final polymerization catalyst; and a polymer obtainable by this process.

11 Claims, 2 Drawing Sheets

(51) Int. Cl.
  *C08G 65/10* (2006.01)
  *C08G 65/26* (2006.01)

(58) Field of Classification Search
  USPC .................................................. 528/413, 421
  See application file for complete search history.

(56) References Cited

U.S. PATENT DOCUMENTS

| | | |
|---|---|---|
| 3,037,943 A | 6/1962 | Hill et al. |
| 3,281,312 A | 10/1966 | Fetters et al. |
| 3,499,847 A | 3/1970 | Mange et al. |
| 3,627,702 A | 12/1971 | Gehm et al. |
| 3,729,441 A | 4/1973 | Tomomatsu |
| 4,193,892 A | 3/1980 | Goeke et al. |
| 4,267,309 A | 5/1981 | Goeke et al. |
| 5,186,942 A | 2/1993 | Deters et al. |
| 6,010,971 A * | 1/2000 | Tsai .............. C08G 65/3322 442/381 |
| 2007/0060770 A1 | 3/2007 | Matheson |
| 2007/0269491 A1 | 11/2007 | Sagel et al. |
| 2010/0197873 A1* | 8/2010 | Wasserman ........ C08G 65/2654 526/189 |

FOREIGN PATENT DOCUMENTS

| | | |
|---|---|---|
| EP | 0008131 A1 | 2/1980 |
| GB | 1539650 | 1/1979 |
| WO | 2008145579 A2 | 12/2008 |

OTHER PUBLICATIONS

Polyox Water-Soluble Resins, Dow Bulletin, 326-00002-0303, Mar. 2003.

J. Chromo, 2005, 1068, p. 249-260, Porsch et al.

\* cited by examiner

PROCESS FOR PREPARING HIGH MOLECULAR WEIGHT POLYMERS BY POLYMERIZING EPOXIDE MONOMERS

FIELD

This invention relates to a process for polymerizing an epoxide monomer such as ethylene oxide in the presence of a novel catalyst resulting in exceptionally high molecular weight polymer products.

INTRODUCTION

The catalytic polymerization of olefin oxides has been practiced for the past decades, one of the commercial processes being the suspension polymerization of ethylene oxide in a hydrocarbon solvent such as isopentane using as a catalyst calcium hexammine ($Ca(NH_3)_6$) modified with a mixture of propylene oxide and acetonitrile. In this process, it is believed that a living polymer is generated and is eventually terminated by impurities which build up in the medium. However, the actual structure of the catalytically active species and the mechanism of the polymerization are still unknown.

Various methods to produce the above-mentioned olefin oxide polymerization catalysts are described in the prior art. Some of those catalysts are said to be active in effecting polymerization of olefin oxides resulting in polymers having a relatively high molecular weight.

U.S. Pat. No. 2,969,402 and U.S. Pat. No. 3,037,943 teach the reaction of alkaline earth metal hexammine with an alkylene oxide and a saturated aliphatic hydrocarbon nitrile in excess liquid ammonia. The process is conducted in a batch type mode by dissolving the calcium metal in liquid ammonia, adding the aliphatic nitrile and the alkylene oxide and subsequently evaporating the ammonia to obtain a solid residue. Said solid product is used as a catalyst in the polymerization of ethylene oxide to produce a relatively low molecular weight poly(ethylene oxide).

U.S. Pat. No. 3,627,702 is directed to a process for the production of high molecular weight polymers of 1,2-alkylene oxides using a catalyst prepared by reacting an alkaline earth metal hexammine and/or alkaline earth metal amide in liquid ammonia with a 1,2-alkylene oxide and cyanamide and/or dicyandiamide. In the examples the catalysts are prepared in a one-pot reaction by dissolving calcium in liquid ammonia and then adding ethylene oxide, cyanamide or its dimer, and an organic solvent, i.e. heptane. After evaporation of ammonia and part of the organic solvent the catalyst is obtained in the form of a suspension in heptane which is directly employed in the polymerization of ethylene oxide. In a comparative example a combination of ethylene oxide/acetonitrile is used as modifier in the preparation of the catalyst instead of ethylene oxide in combination with cyanamide or its dimer. However, the ethylene oxide polymer obtained when using this catalyst has a lower viscosity than those polymers obtained by using the ethylene oxide/cyanamide-modified catalyst. This indicates that the described ethylene oxide/acetonitrile-modified catalyst does not serve to produce exceptionally high molecular polymers.

U.S. Pat. No. 4,193,892 and U.S. Pat. No. 4,267,309 describe a further development of the catalyst preparation disclosed in U.S. Pat. No. 2,969,402 and U.S. Pat. No. 3,037,943 to obtain an olefin oxide polymerization catalyst providing an improvement in the productivity and/or in the molecular weight picture of the polymer. The modification includes aging the resulting catalyst following admixing of calcium metal, ammonia, an alkylene oxide and an organic nitrile, which aging is performed at a temperature of from 150° C. to 225° C. for up to 15 h after evaporation of ammonia. As it is advantageous when the final catalyst product is in slurry form for direct use in the olefin oxide polymerization, a high or intermediate boiling organic diluent is preferably added after or concurrently with evaporation of ammonia. The complete reaction including the evaporation of ammonia, addition of diluent and aging is conducted in a single vessel. The ethylene oxide polymers that are prepared by catalytic polymerization in the examples have 1 weight % solution viscosities at 25° C. of up to 17,000 mPa·s.

CN 1740209 A teaches the preparation of an ethylene oxide polymerization catalyst by dissolving calcium in liquid ammonia, adding propylene oxide modifier, acetonitrile and a carrier of a nanoscalic silica or nanoscalic mesoporous molecular sieve, evaporating excessive ammonia after complete reaction and adding a high boiling alkane solvent to form a catalyst slurry. The catalyst is used in the polymerization of ethylene oxide and results in ethylene oxide polymers having molecular weight ranges of from 50,000 to 2,000,000.

There are further references mentioning high molecular weight ethylene oxide polymers.

Poly(ethylene oxide)s having a weight molecular weight within the range of from 100,000 to 9,000,000 are commercially available from the Dow Chemical Company and various grades are sold under the trade names POLYOX Water-Soluble Resins (POLYOX WSR) and UCARFLOC Polymers (see Bulletin Form No. 326-00001-0302 AMS, published March 2002 by the Dow Chemical Company and entitled "POLYOX Water-Soluble Resins").

U.S. Pat. No. 3,729,441 teaches how to inhibit degradation of poly(ethylene oxide) and discloses that polymers having a molecular weight such as 10,000,000 and even higher can be employed. However, in the examples only polymers having a molecular weight of up to 250,000 are used.

U.S. Pat. No. 5,186,942, U.S. Pat. No. 3,281,312 and US 2007/0269491 refer to the use of poly(ethylene oxide) having a wide molecular weight range of up to 10,000,000 Dalton in various applications. These references do not describe the production of poly(ethylene oxide) but generally refer to commercial availability of the poly(ethylene oxide). In all three cases only Union Carbide Corporation is mentioned as a supplier of the poly(ethylene oxide). However, Union Carbide Corporation which is now a wholly owned subsidiary of The Dow Chemical Company has never offered a poly(ethylene oxide) having a molecular weight of 10,000,000 Dalton or above. In addition, there are no known other commercial suppliers claiming to offer a poly(ethylene oxide) having a molecular weight of 10,000,000 Dalton.

For several applications including flocculating agents, super swelling tablets, osmotic dosage forms, aqueous drag reduction/drift control (reduction of the turbulent frictional drag of water in which olefin oxide polymers are dissolved), e.g. drift control of agricultural sprays, and concrete pumping lubricity olefin oxide polymers having extremely high molecular weight are desired. Hitherto, olefin oxide polymers having a weight average molecular weight of more than 9,000,000 are not known and thus, the problem addressed by the present invention is to provide a method for preparing extremely high molecular weight olefin oxide polymers, i.e. olefin oxide polymers such as poly(ethylene oxide) having a weight average molecular weight of more than 9,000,000.

SUMMARY

The problem is solved by a process for polymerizing an epoxide monomer, preferably ethylene oxide, comprising carrying out the process in the presence of a catalytically active amount of a catalyst obtainable by a preparation process comprising admixing at least one alkaline earth metal, liquid ammonia, an alkylene oxide, which is optionally substituted by aromatic radicals, and an organic nitrile having at least one acidic hydrogen atom to prepare a slurry of modified alkaline earth hexammine in liquid ammonia;

continuously transferring the slurry of modified alkaline earth hexammine in liquid ammonia into a stripper vessel and continuously evaporating ammonia, thereby accumulating the modified catalyst in the stripper vessel; and upon complete transfer of the slurry of modified alkaline earth hexammine into the stripper vessel, aging the modified catalyst to obtain the final polymerization catalyst.

The present invention is also directed to the polymer obtainable by the above process and to its uses.

DETAILED DESCRIPTION

Figure 1:
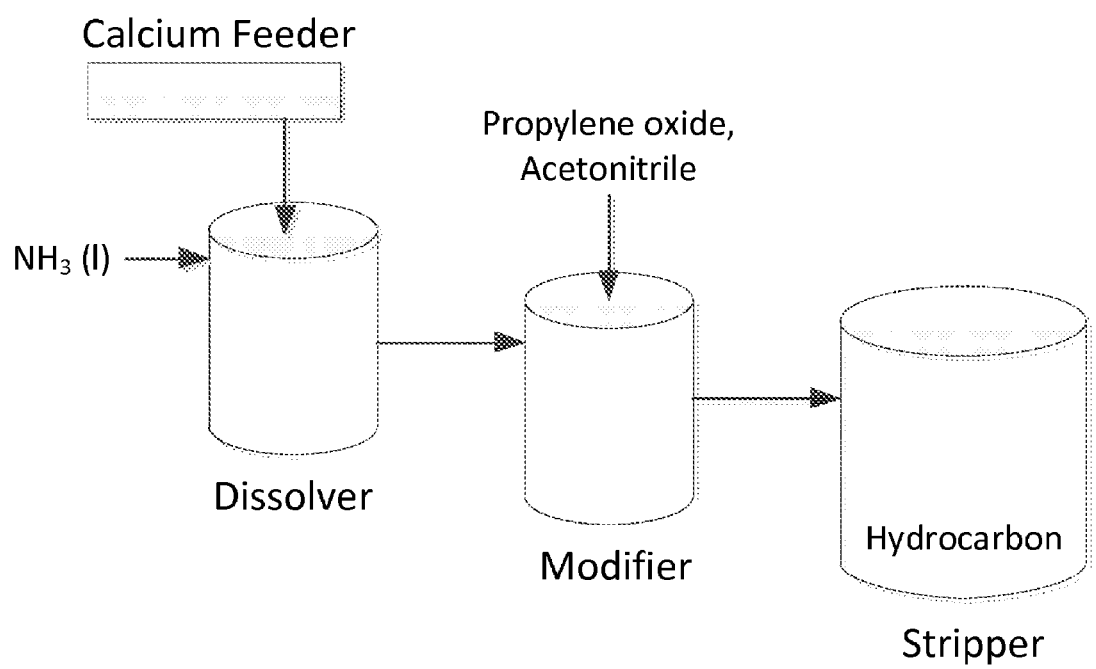
FIG. 1 illustrates a semi-continuous stirred tank reaction system utilized in the process for producing an olefin oxide polymerization catalyst.

It is surprising that modifying the standard batch type process for preparing an olefin oxide polymerization catalyst (as for example disclosed in U.S. Pat. No. 4,193,892 and U.S. Pat. No. 4,267,309) by conducting it in a semi-continuous manner leads to a highly active catalyst effective to produce olefin oxide polymers of higher molecular weight than achievable using current technology.

It is understood that the technical meaning of the terms "olefin oxide" and "alkylene oxide" is identical. However, for reasons of clarity the terms "olefin oxide" and "poly (olefin oxide)", respectively, are used in the present application to refer to the monomers or polymers taking part in the polymerization promoted by the inventive catalyst whereas the term "alkylene oxide" is used to refer to the modifier utilized in the preparation of the catalyst. Two different terms are used to emphasize that the "olefin oxide" and the "alkylene oxide" need not be identical compounds but can be selected independently.

The catalyst is referred to as "modified alkaline earth hexammine" and "modified calcium hexammine" or "modified alkaline earth hexammoniate" and "modified calcium hexammoniate", the technical terms "ammine" and "ammoniate" being synonymous. However, the fact that the catalyst is complex, pyrophoric, air sensitive, and insoluble in, or reactive with, most organic solvents makes chemical as well as spectroscopic analysis difficult. Consequently, it is not surprising that the structure of the catalyst prepared by either the conventional process or the improved process of the present invention is unknown. The improved new catalyst of the present invention catalyst will have to be, therefore, defined by the process by which it is made.

First, a slurry of the modified alkaline earth hexammine in liquid ammonia is prepared by admixing the at least one alkaline earth metal, liquid ammonia, the alkylene oxide and the organic nitrile. This step is carried out in the liquid phase with ammonia in the liquid state under suitable pressure, preferably it is carried out with agitation.

The alkaline earth metal used to prepare the alkaline earth hexammine is typically selected from calcium, strontium, barium and its mixtures; most preferably it is calcium.

The liquid ammonia employed in the process is preferably essentially anhydrous. Reacting the alkaline earth metal, preferably calcium, with excessive liquid ammonia results in the formation of alkaline earth hexammine dissolved in liquid ammonia. As two modifiers are also introduced in this step the product of this reaction is a modified alkaline earth hexammine.

One of the modifiers is an alkylene oxide which is optionally substituted by aromatic radicals. The optionally substituted alkylene oxides for use in the present invention consist of carbon, hydrogen, and oxirane oxygen atoms. The oxirane oxygen is bonded to vicinal or adjacent carbon atoms to form an epoxy group. The alkylene oxide can be an aliphatic, cycloaliphatic or mixed aliphatic/cycloaliphatic alkylene oxide. In some embodiments the alkylene oxide is substituted by one or more aromatic radicals, preferably aromatic radicals having 6 to 12 carbon atoms, e.g. phenyl. Illustrative alkylene oxides include ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4-trimethyl-2,3-epoxypentane, cyclohexylepoxythane, 7-oxabicyclo[4.1.0]heptane, 6-oxabicyclo[1.3.1.0]hexane, 3-methyl-6-oxabicyclo[3.1.0]hexane, and 4-ethyl-6-oxabicyclo[3.1.0]hexane. Exemplary alkylene oxides having aromatic substituents are styrene oxide and 1-phenyl-1,2-epoxypropane. Typically, the number of carbon atoms in the optionally substituted alkylene oxide ranges from 2 to 20, alkylene oxides having 2 to 5 carbon atoms are preferred, e.g. ethylene oxide, propylene oxide, 1,2-epoxybutane, and 2,3-epoxybutane. A single alkylene oxide or mixtures of two or more different alkylene oxides can be used. Propylene oxide is most preferred.

The second modifier is an organic nitrile consisting of carbon, nitrogen, and hydrogen atoms, at least one hydrogen atom being acidic. Typically, the nitrile is a mononitrile. The nitrile is preferably a saturated aliphatic mononitrile, more preferably a saturated aliphatic mononitrile wherein the organic moiety has 2 to 10 carbon atoms, e.g. acetonitrile, propionitrile, and butyronitrile, valeronitrile, isovaleronitrile, capronitrile, caprylonitrile and caprinitrile. Aromatic nitriles, preferably mononitriles such as benzonitrile and ortho-toluenenitrile are also useful. Acetonitrile is most preferred.

The order of introduction of the alkaline earth metal, the ammonia, and the modifiers can vary. The preferred procedure is to conduct the preparation of the slurry of modified alkaline earth hexammine in liquid ammonia in two steps. More preferably, the first step is to add the alkaline earth metal to the ammonia to form a solution of alkaline earth hexammine and the second step is to add the modifiers. The modifiers may be added subsequently in either sequence or simultaneously as two separate feeds or preferably as a mixture. Typically, the mixture of alkylene oxide and organic nitrile comprises 10 to 98 mol % of alkylene oxide and 2 to 90 mol % of organic nitrile, more preferably it is a mixture of 40 to 80 mol % of alkylene oxide and 20 to 40 mol % of organic nitrile, and most preferably a mixture of about 60 mol % of alkylene oxide and about 40 mol % of organic nitrile. One alternative mode of preparation is to introduce the alkaline earth metal and modifiers first together with a low boiling (and low freezing) organic diluent and then add the ammonia. Another alternative mode is to add the alkaline earth metal to a mixture of the ammonia and the modifiers.

In preferred embodiments the preparation of the slurry of modified alkaline earth hexammine in liquid ammonia is conducted in a continuous manner and comprises continually feeding the alkaline earth metal and liquid ammonia and continuously feeding the alkylene oxide and the organic nitrile. "Continually feeding" the alkaline earth metal includes both continuously feeding the alkaline earth metal or constantly feeding the alkaline earth metal in repeated single portions (multiple charges). A similar definition of "continually" feeding or adding applies to "continually" feeding or adding ammonia. Feeding the alkaline earth metal and ammonia in multiple charges is sometimes practicable in a small scale production process to mimic or approximate a continuous addition.

If the continuous mode is applied to the preferred two-step process described above this transforms to a process wherein the slurry of the modified alkaline earth hexammine is prepared in two different vessels: a first vessel ("dissolver vessel") where the alkaline earth metal and ammonia are combined to form alkaline earth hexammine dissolved in liquid ammonia and a second vessel ("modifier vessel") where the modifiers are added and the modified alkaline earth hexammine slurried in liquid ammonia is formed. More specifically, the continuous process to prepare the slurry of modified alkaline earth hexammine, preferably modified calcium hexammine, in liquid ammonia in two vessels comprises:

(1a) continually feeding alkaline earth metal, preferably calcium, into the dissolver vessel comprising liquid ammonia and (1b) continually adding liquid ammonia to form alkaline earth hexammine dissolved in liquid ammonia;

(2a) continuously transferring the alkaline earth hexammine solution into the modifier vessel; and (2b) continuously feeding the alkylene oxide and the organic nitrile into the modifier vessel to form a slurry of modified alkaline earth hexammine in liquid ammonia.

Preferably the alkaline earth metal is fed to the dissolver vessel continuously over the duration of the reaction in order to maintain an appropriate level in the dissolver vessel. Appropriate dosing and feeding systems for solids are well known to the person skilled in the art. It is preferred to use a system that avoids backwash of the pressurized ammonia from the dissolver. Typically, the liquid ammonia is added simultaneously with the alkaline earth metal to maintain the desired alkaline earth metal concentration in liquid ammonia. If the alkaline earth metal is fed in multiple charges over the duration of the reaction each alkaline earth metal charge is typically immediately followed by the addition of sufficient liquid ammonia to maintain the desired alkaline earth metal concentration. In all embodiments agitation (stirring) of the dissolver vessel is advantageous.

It is preferred to maintain the mole fraction of alkaline earth metal, preferably calcium, in the liquid ammonia in the dissolver vessel within the range of from 0.1 to 16 mol %, more preferably from 1 to 8 mol %, and most preferably from 2 to 6 mol %.

Typically, the dissolver vessel is held at a temperature within the range of from −50 to 25° C. and at a pressure within the range of from 8 to 1100 kPa, preferably at a temperature within the range of from −25 to 15° C. and at a pressure within the range of from 120 to 750 kPa, more preferably at a temperature within the range of from −15 to 5° C. and at a pressure within the range of from 200 to 600 kPa, and most preferably at a temperature within the range of from −11 to 1° C. and at a pressure within the range of from 250 to 520 kPa.

The alkaline earth hexammine solution is continuously drained off from the dissolver vessel and introduced in the modifier vessel simultaneously with the two modifiers, alkylene oxide and organic nitrile, to form the slurry of modified alkaline earth hexammine in liquid ammonia. As described above the modifiers can be added as separate feeds or as a mixture (including preferred mixing ratios described above), the latter being the preferred mode. Agitation (stirring) of the modifier vessel is advantageous.

Typically, the alkaline earth hexammine solution is transferred to the modifier vessel at a controlled rate. Methods to control the rate are well known to the person skilled in the art.

In preferred embodiments the alkylene oxide and the organic nitrile are fed into the modifier vessel at a rate to provide 0.5 to 1.5 mol of total alkylene oxide and organic nitrile, preferably 0.7 to 1.3 mol of total alkylene oxide and organic nitrile, more preferably 0.9 to 1.1 mol of total alkylene oxide and organic nitrile, and most preferably 1 mol of total alkylene oxide and organic nitrile for 1 mol of alkaline earth hexammine flowing in from the dissolver vessel.

Usually, the modifier vessel is held at a temperature within the range of from −45 to 30° C. and at a pressure within the range of from 1 to 1200 kPa, preferably at a temperature within the range of from −20 to 20° C. and at a pressure within the range of from 90 to 900 kPa, more preferably at a temperature within the range of from −10 to 10° C. and at a pressure within the range of from 190 to 620 kPa, and most preferably at a temperature within the range of from −6 to 6° C. and at a pressure within the range of from 240 to 540 kPa.

In the following step the slurry of modified alkaline earth hexammine in liquid ammonia either prepared in a batch type mode or by a continuous process as described directly above is transferred into a further vessel ("stripping vessel") and the ammonia is continuously evaporated. Thus, the modified catalyst accumulates in the stripping vessel. Agitation (stirring) of the stripping vessel is advantageous. The simultaneous introduction of the ammoniacal slurry of modified alkaline earth hexammine into the stripper vessel and evaporation of the ammonia results in an immediate removal of ammonia from the catalyst. In preferred embodiments of the present invention an accumulation of ammonia in the stripper vessel is avoided.

Preferably, the stripper vessel is held at a temperature of at least 30° C., preferably at least 40° C. above the boiling point of ammonia at the system pressure. Typically, the stripper vessel is held at a temperature within the range of from 0 to 100° C. and at a pressure within the range of from 30 to 6300 kPa, preferably at a temperature within the range of from 25 to 100° C. and at a pressure within the range of from 100 to 3300 kPa, more preferably at a temperature within the range of from 25 to 70° C. and at a pressure within the range of from 200 to 520 kPa, and most preferably at a temperature within the range of from 29 to 41° C. and at a pressure within the range of from 240 to 420 kPa.

Upon complete transfer of the ammoniacal slurry of modified alkaline earth hexammine into the stripper vessel the modified catalyst is aged to obtain the final olefin oxide polymerization catalyst. In case of a continuous production of the slurry of modified alkaline earth hexammine in liquid ammonia the transfer into the stripper vessel is completed when after a predetermined amount of alkaline earth metal has been used up all feeds are terminated and the dissolver vessel (via the modifier vessel) and modifier vessel are emptied into the stripper vessel.

The stripper vessel is heated to reach the aging temperature. Typically, the aging is carried out at a temperature within the range of from 150 to 225° C. and at a pressure within the range of from 30 to 650 kPa, preferably at a temperature within the range of from 175 to 225° C. and at a pressure within the range of from 100 to 450 kPa, and more preferably at a temperature within the range of from 190 to 217° C. and at a pressure within the range of from 125 to 380 kPa. In preferred embodiments the aging is carried out for 0.1 to 15 h, preferably for 1 to 10 h, more preferably for 2 to 5 h, and most preferably for about 3 h. At the end of the aging period the catalyst is cooled to room temperature by air quenching or any other conventional quenching means.

It is desirable when the final catalyst product is in slurry form for transfer to, and direct use, in the olefin oxide polymerization. Thus, it is preferred to carry out at least part of the process in an inert organic liquid diluent. The organic diluent is one which is inert to any of the reactants or the catalyst product and will not be affected by operating conditions including evaporation of ammonia. As the diluent will be used to form the slurry used in the polymerization, it also should be inert to the polymerization reactants and product and the polymerization operating conditions. One advantage of using an inert diluent is in the realm of safety in view of the pyrophoric and air sensitive nature of the catalyst.

Preferably, the inert organic diluent has a boiling point within the range of from 25 to 330° C. and more preferably it is a $C_{12}$ to $C_{19}$ hydrocarbon diluent such as for example dodecane, tridecane, tetradecane, pentadecane and hexadecane. A single inert organic diluent or mixtures of two or more different organic diluent can be used. An exemplary inert organic diluent is a mixture of dodecane, tridecane and tetradecane such as NORPAR 13 ® hydrocarbon.

Typically, the inert organic diluent is contained in the stripper vessel into which the slurry of the modified catalyst in liquid ammonia is introduced and since the organic diluent does not or not completely evaporate under stripping conditions a slurry of the modified catalyst in the diluent is formed. Preferably, the weight ratio of inert organic diluent in the stripper vessel to total alkaline earth metal charged, preferably total calcium charged, is within a range of from 1:1 to 20:1, preferably from 2:1 to 15:1, and more preferably from 4:1 to 9:1.

If an inert organic diluent is used, the catalyst is aged in the form of a slurry in the organic diluent. The stripping and aging conditions described above are applicable for both cases: a dry catalyst product (no organic diluent present) and the catalyst product in slurry form. However, if no organic diluent is present the applicable pressure ranges in the stripping and aging steps are even broadened and include lower pressures up to 0 kPa.

Throughout the preparation of the catalyst, conventional precautions are preferably taken to exclude water, oxygen, and carbon dioxide from the system. This may be accomplished by using properly sealed apparatus together with an inert atmosphere such as nitrogen. The inert gas can be used first as a sweep and then the process steps can be conducted in the same atmosphere.

In preferred embodiments the present process for the production of an olefin oxide polymerization catalyst comprises:

(1a) continually feeding a predetermined amount of alkaline earth metal, preferably calcium, into a dissolver vessel comprising liquid ammonia and (1b) continually adding liquid ammonia to form alkaline earth hexammine dissolved in liquid ammonia;

(2a) continuously transferring the alkaline earth hexammine solution into a modifier vessel;

(2b) continuously feeding the alkylene oxide and the organic nitrile into the modifier vessel to form a slurry of modified alkaline earth hexammine in liquid ammonia;

(3a) continuously transferring the slurry of modified alkaline earth hexammine in liquid ammonia into the stripper vessel and (3b) continuously evaporating ammonia, thereby accumulating the modified catalyst in the stripper vessel;

(4b) upon consumption of the alkaline earth metal gradually terminating all feeds and emptying the dissolver vessel via the modifier vessel into the stripper vessel; and (4c) aging the modified catalyst in the stripper vessel to obtain the final olefin oxide polymerization catalyst.

The preferred compounds and conditions described before are applicable in each of the above process steps.

The finished catalyst in dry or preferably in slurry form can then used in a conventional process for polymerizing an epoxide, typically in a suspension polymerization process. The novel catalysts of this invention are useful in effecting the polymerization of epoxide monomers which contain a cyclic group composed of two carbon atoms and one oxygen atom. Typically, these epoxide monomers can be characterized by the following formula:

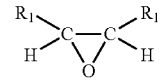

wherein each $R^1$, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R^1$ variables together with the epoxy carbon atoms, i.e. the carbon atoms of the epoxy group can represent a saturated cycloaliphatic hydrocarbon nucleus which contains from 4 to 10 carbon atoms, preferably from 4 to 8 carbon atoms, for example, a saturated cycloaliphatic hydrocarbon nucleus derived from cycloalkane, alkyl substituted cycloalkane, cyclobutane, cyclopentane, cyclohexane, cycloheptane, cyclooctane, methylcyclopentane, or amylcyclohexane. Illustrative $R^1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclobexyl, 2-methylcyclohexyl, and cycloheptyl.

A single epoxide monomer or an admixture of at least two different epoxide monomers can be employed as the monomeric feed. A broad range of epoxide monomers can be used in the polymerization process and representative expoxide monomers include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclo-hexyl-2,3-epoxypentane, chlorostyrene oxide, styrene oxide, ortho-, meta-, and para-ethylstyrene oxide, glycidyl benzene, the oxabicycloalkanes and alkyl-substituted oxabicycloalkanes, e.g., 7-oxabicyclo[4.1.0]heptane, oxabicyclo[3.1.0]hexane, 4-propyl-7-oxabicyclo[4.1.0]heptane, and 3-amyl-6-oxabicyclo[3.1.0]hexane.]

It is preferred that the epoxide monomer is an olefin oxide, more preferably an olefin oxide having 2 to 20 carbon atoms, such as for example ethylene oxide, propylene oxide, 1,2-epoxy-butane, or 2,3-epoxybutane. The most preferred monomer is ethylene oxide. Outstanding results are achieved in polymerizing ethylene oxide via that suspension polymerization route.

The novel catalyst can be used in a concentration in the range of 0.02 to 10 percent by weight, such as 0.1 to 3 percent by weight, based on the weight of the epoxide monomer feed, preferably olefin oxide feed. Typically, the catalyst is used in an amount corresponding to 0.0004 to 0.0040 g of alkaline earth metal per g of epoxide monomer, such as 0.0004 to 0.0040 g of calcium per g of olefin oxide, preferably 0.0007 to 0.0021 g of alkaline earth metal per g of epoxide monomer, such as 0.0007 to 0.0021 g of calcium per g of olefin oxide, more preferably 0.0010 to 0.0017 g of alkaline earth metal per g of epoxide monomer, such as 0.0010 to 0.0017 g of calcium per g of olefin oxide, and most preferably 0.0012 to 0.0015 g of alkaline earth metal per g of epoxide monomer, such as 0.0012 to 0.0015 g of calcium per g of olefin oxide.

The polymerization reaction can be conducted over a wide temperature range. Polymerization temperatures can be in the range of from −30 to 150° C. and depends on various factors, such as the nature of the epoxide monomer(s) employed, the particular catalyst employed, and the concentration of the catalyst. A typical temperature range is from 0 to 150° C. For the preparation of granular poly(ethylene oxide) (which preparation is a preferred embodiment and is described hereinafter in detail) a reaction temperature below 70° C. is prefened. Though granular poly(ethylene oxide) can be prepared at a reaction temperature of about 65 to 70° C. the poly(ethylene oxide) product tends to accumulate on the interior surfaces of the reaction equipment. Consequently, it is prefened that the reaction temperature for the preparation of granular poly(ethylene oxide) be in the range of from −30 to 65° C. and more preferably from 0 to 60° C. In an extremely desirable aspect the polymerization reaction is conducted below the softening point of the resulting granular poly(ethylene oxide) product.

The pressure conditions are not specifically restricted and the pressure is set by the boiling points of the diluent and monomer(s) used in the polymerization process.

In general, the reaction time will vary depending on the operative temperature, the nature of the epoxide oxide reagent(s) employed, the particular catalyst and the concentration employed, the use of an inert diluent, and other factors. Polymerization times can be run from minutes to days depending on the conditions used. Preferred times are 1 to 10 h.

When polymerizing an admixture containing two different epoxide monomers, the proportions of said epoxides can vary over the entire range. Preferably the concentration of either monomeric epoxide is in the range of from 5 to 95 weight percent, based on the total weight of said epoxides.

The polymerization reaction preferably takes place in the liquid phase. Typically, the polymerization reaction is conducted under an inert atmosphere, e.g. nitrogen. It is also highly desirable to effect the polymerization process under substantially anhydrous conditions Impurities such as water, aldehyde, carbon dioxide, and oxygen which may be present in the epoxide feed and/or reaction equipment should be avoided. The polymers of this invention can be prepared via the bulk polymerization, suspension polymerization, or the solution polymerization route, suspension polymerization being preferred.

The polymerization reaction can be carried out in the presence of an inert organic diluent such as, for example, aromatic hydrocarbons, benzene, toluene, xylene, ethylbenzene, and chlorobenzene; various oxygenated organic compounds such as anisole, the dimethyl and diethyl ethers of ethylene glycol, of propylene glycol, and of diethylene glycol; normally-liquid saturated hydrocarbons including the open chain, cyclic, and alkyl-substituted cyclic saturated hydrocarbons such as pentane (e.g. isopentane), hexane, heptane, various normally-liquid petroleum hydrocarbon fractions, cyclohexane, the alkylcyclohexanes, and decahydronaphthalene.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic diluent, and subsequently drying same under reduced pressure at slightly elevated temperatures. Another route involves dissolution in a first inert organic solvent, followed by the addition of a second inert organic solvent which is miscible with the first solvent, but which is a non-solvent for the polymer product, thus precipitating the polymer product. Recovery of the precipitated polymer can be effected by filtration, decantation, etc., followed by drying same as indicated previously. Granular poly(ethylene oxide) can be recovered from the reaction product by filtration, decantation, etc., followed by drying said granular poly(ethylene oxide) under reduced pressure at slightly elevated temperatures, e.g. 30 to 40° C. If desired, the granular poly(ethylene oxide), prior to the drying step, can be washed with an inert, normally-liquid organic diluent in which the granular polymer is insoluble, e.g. pentane, heptane, cyclohexane, and then dried as illustrated above.

As indicated previously the novel catalysts of the instant invention are highly useful in the preparation of granular poly(ethylene oxide) via the suspension polymerization process. Granular poly(ethylene oxide) results from the suspension polymerization of an agitated reaction mixture comprising ethylene oxide in contact with a catalytic amount of the novel catalysts previously described, the suspension polymerization reaction being conducted at a temperature below the softening point of the resulting granular poly(ethylene oxide) product. A suitable temperature range is from about −30 to +65° C., and preferably from about 0 to 60° C. Agitation of the reaction mixture is recommended in order to maintain catalyst suspended in said reaction mixture during the course of the polymerization reaction.

Unlike the granular poly(ethylene oxide) which directly results from the suspension polymerization route as illustrated above, the bulk or solution polymerization of ethylene oxide yields non-granular resinous poly(ethylene oxide) which is substantially an entire polymeric mass or an agglomerated polymeric mass or it is dissolved in the inert, organic diluent. It is understood, of course, that the term "bulk polymerization" refers to polymerization in the absence of an inert, normally-liquid organic diluent, and the term "solution polymerization" refers to polymerization in the presence of an inert, normally-liquid organic diluent in which the monomer employed and the polymer produced are soluble.

Granular poly(ethylene oxide) directly results from effecting the instant invention via the suspension polymerization route. Granular poly(ethylene oxide) possesses several highly desirable characteristics. One can recover granular poly(ethylene oxide) from the reaction product by the mere technique of decantation or filtration, followed by drying at slightly elevated temperatures, e.g. 30 to 40° C. Further treatment is unnecessary and the granular polymer can be shipped to customers in bags or drums. Poly(ethylene oxide) prepared via the solution polymerization route necessitates the complete removal of the inert organic vehicle at elevated temperatures in order to recover the polymer dissolved in said vehicle. The resulting polymer, of course, is not granular. Mechanical means are necessary to reduce non-granular, resinous poly(ethylene oxide) prepared by the bulk or solution polymerization routes to a particle size which approximately corresponds to the synthetically formed granular poly(ethylene oxide).

Granular poly(ethylene oxide) can be produced (as previously indicated) via the suspension polymerization route by employing an inert, normally-liquid organic diluent in which the ethylene oxide monomer is soluble and the resulting polymer is insoluble. It is understood, of course, that the diluent employed is non-reactive with ethylene oxide. Illustrative diluents suitable in the suspension polymerization process are the normally-liquid saturated hydrocarbons, e.g. saturated aliphatic hydrocarbons, saturated cycloaliphatic and alkyl-substituted cycloaliphatic hydrocarbons, and various normally-liquid saturated ethers. Examples of preferred diluents include, among others, pentane such as isopentane, hexane, heptane, isoheptane, ethylpentane, the octanes, the decanes, various petroleum hydrocarbon fractions, cyclohexane, alkyl-substituted cyclohexanes, and decahydronaphthalene. Other illustrative diluents which can be employed include diethyl, dipropyl, dibutyl, and higher dialkyl ethers; dioxane; and the lower glycol dialkyl ethers of diethylene glycol. It is to be noted that certain of these ether diluents become solvents for the polymer at elevated temperatures. Among such ethers are dioxane, the dimethyl and diethyl ethers of ethylene glycol and diethylene glycol.

A preferred method for producing granular poly(ethylene oxide) is to feed the ethylene oxide into the stirred diluent which contains the novel catalyst, the reaction temperature being maintained below the softening point of the resulting granular polymer product, e.g. below 65 to 70° C. When operating in this manner pressure equipment is not necessary. The ethylene oxide is fed into the stiffed diluent and unreacted ethylene oxide, if any, is allowed to pass out of the reaction vessel, for example, through a vent, an appropriately adjusted blow-off valve, or other means, as desired. It is highly desirable to conduct the suspension polymerization reaction under a blanket of nitrogen gas, care being taken to exclude oxygen and carbon dioxide. The suspension polymerization can be conducted as a batch, semi-continuous, or a continuous process.

The single components of the polymerization reaction, i.e. the epoxide monomer, the catalyst and the diluent, if used, may be added to the polymerization system in any practicable sequence as the order of introduction is not crucial for the present invention.

The use of the novel catalysts in the polymerization of epoxide monomers allows for the preparation of exceptionally high molecular weight polymers. Without being bound by theory it is believed that the unique capability of the novel catalysts to produce longer polymer chains than are otherwise obtained in the same polymerization system using the same raw materials is due to the combination of higher reactive site density (which is considered activity) and the ability to internally bind catalyst poisons.

The olefin oxide polymers that are obtained by using the novel catalysts according to the present invention have extremely high (ultrahigh) molecular weight. In case of poly(ethylene oxide) the approximate weight average molecular weight is preferably equal to or greater than 10,000,000 Dalton. Current technology to directly determine the molecular weight of ultrahigh molecular weight poly (ethylene oxide) is limited and thus, only the approximate weight average molecular weight can be measured by an indirect method. Poly(ethylene oxide) is water-soluble and the 1% and 0.5% solution viscosities of the inventive ethylene oxide polymers are compared with the solution viscosities of commercially available high molecular weight ethylene oxide polymers with known weight average molecular weight.

With the higher molecular weight polymers, viscosity measurements are complicated because of the difficulties encountered in dissolving the polymers in aqueous systems. During dissolution the mixture assumes a mucous-like consistency with a high tendency to gel. In addition, the extremely long chains are quite sensitive to shearing forces and must be stirred under very low shearing conditions in order to minimize mechanical degradation. The procedure for dissolving the polymers of the present invention may be found in Bulletin Form No. 326-00002-0303 AMS, published March 2003 by the Dow Chemical Company and entitled "POLYOX Water-Soluble Resins Dissolving Techniques". The solution viscosity values that are recited throughout this application refer to solutions of ethylene oxide polymers that are prepared according to the procedure set forth in the example.

The term "1% aqueous solution viscosity" as used herein means the dynamic viscosity of a 1 weight % solution of the polymer in a mixture of water and isopropyl alcohol in a weight ratio of about 6:1. Accordingly, the term "0.5% aqueous solution viscosity" means the dynamic viscosity of a 0.5 weight % solution of the polymer in a mixture of water and isopropyl alcohol in a weight ratio of about 6:1. In both cases the weight percentage of polymer is based on the weight of water only, i.e. not including the isopropyl alcohol. Preparing the aqueous solutions of the polymers the isopropyl alcohol is added first in order to allow the polymer particles to disperse as individuals before water is added. This seems to greatly minimize gel formation and provides reliable viscosity measurements. The 1% aqueous solution viscosities of the ethylene oxide polymers according to the present invention are preferably greater than 20,000 mPa·s at 25° C. The 0.5% aqueous solution viscosities of the ethylene oxide polymers according to the present invention are preferably greater than 5,000 mPa·s at 25° C. The 1% and 0.5% aqueous solution viscosities of the ethylene oxide polymers are determined at 25° C. using a Brookfield® DV-II+digital viscometer. The Brookfield® guard leg is in place when making the measurement. RV spindle #2 and a speed of 2 RPM are employed to make the measurement. The spindle is immersed in the polymer solution, avoiding entrapping air bubbles, and attached to the viscometer shaft. The height is adjusted to allow the solution level to meet the notch on the spindle. The viscometer motor is activated, and the viscosity reading is taken 5 min after the viscometer motor was started.

The ultrahigh molecular weight olefin oxide polymers, especially the ultrahigh molecular weight ethylene oxide polymers find application in a variety of technical fields and any application requiring high solution thickening properties at low polymer concentration would benefit from the use of the present ultrahigh molecular weight olefin polymers, especially the ultrahigh molecular weight ethylene oxide polymers. The primary applications of those new ultrahigh molecular polymers are in the area of flocculation (as flocculation agent), for applications such as tissue paper production, waste treatment and clay sedimentation. They are, for example, able to improve the yield in papermaking. The new polymers can also be used in pharmaceuticals e.g. in controlled release solid dose matrix systems such as in the production of super swelling tablets for drug delivery and osmotic dosage forms. They also find use in various personal care applications, for example as viscosity improver and foam stabilizer. Further applications include aqueous drag reduction/drift control (reduction of the turbulent frictional drag of water in which they are dissolved) such as drift control of agricultural sprays, and the new polymers may add lubricity to concrete to assist pumpability.

One embodiment of the invention will now be described in detail in the following example.

EXAMPLE

Preparation of Modified Calcium Hexammine Catalyst

The semi-continuous stiffed tank reaction system shown in FIG. 1 was utilized to produce a calcium based catalyst using parallel processing. A K-Tron single screw loss in weight gravimetric solids feeder (model # KCL-24-KQX) fed calcium metal to a lock hopper. The lock hopper was made up of two 1" Kitz ball valves. The lock hopper was operated as follows: A charge of approximately 2.5 g of calcium was fed on top of the top lock hoper ball valve. The top ball valve opened, allowing the calcium metal charge to fall into the lock hopper. The top lock hopper valve immediately closed and the lock hopper was purged with nitrogen gas to remove any traces of oxygen. Upon completion of the nitrogen purge of the lock hopper, the bottom valve was opened and the calcium metal charge dropped into the liquid ammonia contained in the agitated dissolver vessel. The dissolver vessel was maintained at a temperature range of −10° C. to 0° C., and a pressure of 482 to 515 kPa (55-60 psig). Calcium metal was fed in multiple charges over the duration of the reaction in order to maintain an appropriate liquid level in the dissolver vessel. Each calcium charge was immediately followed by the addition of sufficient liquid ammonia to maintain a calcium concentration of approximately 2 mol %. The resulting reaction of calcium metal and liquid ammonia was formation of calcium hexammine, dissolved in liquid ammonia. The calcium hexammine solution was continuously transferred into the modifier vessel, at a controlled rate using a variable speed peristaltic pump. Simultaneously, a mixture of 60 mol % propylene oxide and 40 mol % acetonitrile was added to the modifier vessel. The propylene oxide/acetonitrile mixture was added to the agitated modifier vessel at a rate targeting 1 mol total propylene oxide/acetonitrile for 1 mol of calcium hexammine flowing in from the dissolver vessel. Reaction of the calcium hexammine with the propylene oxide/acetonitrile mixture produced a gray/white precipitate suspended in liquid ammonia. The resulting slurry was continuously pressure transferred from the modifier vessel to the agitated stripper vessel. The modifier vessel was maintained at a temperature of −5° C. to 5° C. and a pressure of 446 to 482 kPa (50-55 psig). The stripper vessel was charged with approximately 1000 mL of NORPAR13 ® hydrocarbon (dodecane/tridecane/tetradecane mixture) prior to initiation of the reaction. The slurry formed in the modifier vessel was continuously transferred to the stripper vessel over the duration of the reaction. The stripper was maintained at a pressure of 377 to 411 kPa (40-45 psig) and a temperature of 30° C. to 40° C. Upon completion of the reaction all flows were terminated, and the stripper vessel pressure was lowered to 129 kPa to 136 kPa (4-5 psig). The stripper was heated at approximately 3 K/min to a maximum temperature of 205° C. The slurry was maintained at 205° C. for 3 h. Upon completion of the thermal treating, the stripper was cooled and the catalyst slurry recovered. The resulting slurry was the catalyst source for the polymerization of ethylene oxide to produce ultrahigh molecular poly(ethylene oxide).

Polymerization of Ethylene Oxide

A laboratory reaction system for the polymerization of ethylene oxide under pressure was utilized to polymerize ethylene oxide employing the catalyst slurry prepared as described in the above example. To the polymerization reactor were charged 443 g of isopentane, 28 g of ethylene oxide and 2 g of hydrophilic silica followed by a quantity of the catalyst slurry containing 0.26 g of calcium, calculated as the metal. Ethylene oxide flow into the reactor was set to maintain a 6 wt % concentration of ethylene oxide in isopentane and the reaction temperature was maintained at 38° C. The reaction was run at a varying pressure around 170 kPa. The reaction system was kept under agitation and ethylene oxide flow was continued until a total of 190 g was fed into the reactor. The resulting finely divided polymer was recovered following vacuum evaporation of the hydrocarbon diluent. A white, granular polymer was obtained and prepared for aqueous dissolution.

Dissolution of Ethylene Oxide Polymer

The resulting granular ethylene oxide polymer was dissolved to form a 0.5% aqueous solution in water/isopropyl alcohol to determine the dynamic viscosity in the following manner:

The polymer was screened through a 20 US Mesh screen prior to dissolution. 3.00 g of polymer were weighed into an 800 mL low-form glass beaker and 125 mL anhydrous isopropyl alcohol were added. The mixture was slurried by agitating at 300-400 RPM for 30-60 s. The stirrer consisted of a shaft with four propellers spaced equidistant. The bottom propeller was positioned to just clear the bottom of the beaker, while the top cleared the surface of the solution. 597 g of high purity deionized water were added to the slurry while maintaining the agitator speed at 300-400 RPM. The water was added quickly in a single addition. Following addition of the water, the agitator speed was maintained at 300-400 RPM for approximately 60 s. The speed of the agitator was reduced to 60 RPM and the solution covered, stirring was continued for 3 h. Upon completion of the dissolution, the stirrer was removed from the solution. The solution was visually examined for the presence of gels, if present, the solution was discarded and a new solution made. The solution was covered and placed in a 25° C. water bath for a minimum of 30 minutes, until reaching a temperature of 25° C. and then the 0.5% aqueous solution viscosity was determined using a Brookfield® DV-II+digital viscometer as described before in the general part of the description (Spindle #2 @ 2 RPM).

The 1% aqueous solution viscosity measurement was performed as above with the exception that the amount of polymer was increased to 6.00 g and the amount of water decreased to 594 g.

0.5% and 1% aqueous solutions of several commercial poly(ethylene oxide) products were prepared as above and their viscosities were determined accordingly.

TABLE 1

Comparison of 0.5% and 1% aqueous solution Brookfield ® viscosities of commercially available poly(ethylene oxide)s and inventive poly(ethylene oxide).

| Sample # | Poly(ethylene oxide) | Approximate $M_W$ | 1% Solution Viscosity (mPa · s) | 0.5% Solution Viscosity (mPa · s) |
|---|---|---|---|---|
| 1* | POLYOX ® WSR-301 | 4,000,000 | 3,940 | 380 |
| 2* | POLYOX ® WSR-303 | 7,000,000 | 7,780 | 940 |
| 3* | POLYOX ® WSR UCARFLOC ® 309 | 8,000,000 | 10,640 | 2,130 |
| 4* | POLYOX ® WSR UCARFLOC ® 309 | 8,000,000 | 14,400 | 3,910 |
| 5* | POLYOX ® WSR UCARFLOC ® 309 | 8,000,000 | 14,470 | 3,250 |
| 6* | POLYOX ® WSR UCARFLOC ® 310 | 9,000,000 | 18,120 | 4,160 |
| 7 | Inventive poly(ethylene oxide) prepared above | >10,000,000 | Over range (>20,000) Extrapolated[1]: 25,470 | 5,730[2] |

Figure 2:
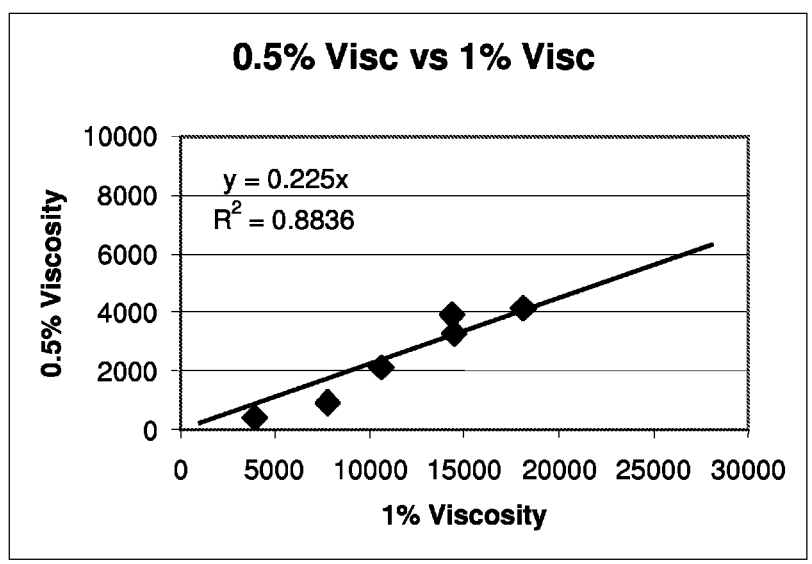
FIG. 2 illustrates the correlation of viscosities of 0.5% and 1% poly(ethylene oxide) solutions.

*Comparative examples
[1]Determined by using the correlation of the above viscosities of 0.5% and 1% poly(ethylene oxide) solutions shown in FIG. 2Average of two measurements Table 1 lists POLYOX® Water-Soluble Resins from The Dow Chemical Company including the highest molecular weight UCARFLOW Polymers commercially available. The approximate weight average molecular weights ($M_w$) indicated are the values as claimed by the manufacturer (see for example Bulletin Form No. 326-00001-0302 AMS, published March 2002 by the Dow Chemical Company and entitled "POLYOX Water-Soluble Resins"). The individual commercial grades marketed under the trade names mentioned in the table cover relatively broad viscosity ranges. In Examples 3*, 4* and 5* different lots of POLYOX® WSR UCARFLOC® 309 polymer were used. As the indicated $M_w$ is the $M_w$ of the whole grade the values in the table do not necessarily correspond to the $M_w$ of the single lot. The inventive poly(ethylene oxide) demonstrated a 38% higher 0.5% aqueous solution viscosity than commercially available UCARFLOC® 310. Viscosity of a 1% aqueous solution of the inventive poly(ethylene oxide) was off scale (>20,000 mPa·s) of the Brookfield® viscometer spindle speed combination of RV spindle #2 at 2 RPM. Based upon the correlation of the solution viscosity of commercial ethylene oxide polymers (Samples 1* to 6*) to molecular weight the estimated molecular weight of the inventive ethylene oxide polymer is greater than 10,000,000 Dalton.

What is claimed is:

1. A process for polymerizing ethylene oxide comprising carrying out the process in the presence of a catalytically active amount of a catalyst, wherein the catalyst is obtained by a preparation process comprising
    admixing at least one alkaline earth metal, liquid ammonia, an alkylene oxide, which is optionally substituted by aromatic radicals, and an organic nitrile having at least one acidic hydrogen atom to prepare a slurry of modified alkaline earth hexammine in liquid ammonia;
    continuously transferring the slurry of modified alkaline earth hexammine in liquid ammonia into a stripper vessel and continuously evaporating ammonia, thereby accumulating the modified catalyst in the stripper vessel; and
    upon complete transfer of the slurry of modified alkaline earth hexammine into the stripper vessel, aging the modified catalyst to obtain the final polymerization catalyst, and
    wherein an ethylene oxide polymer having a 1% aqueous solution viscosity of greater than 20,000 mPa·s at 25° C. is produced.

2. The process of claim 1 wherein during preparation of the catalyst the accumulation of ammonia in the stripper vessel is avoided.

3. The process of claim 1 wherein during preparation of the catalyst the stripper vessel is held at a temperature of at least 30° C. above the boiling point of ammonia at the system pressure.

4. The process of claim 1 wherein during preparation of the catalyst a $C_{12}$ to $C_{19}$ hydrocarbon diluent is contained in the stripper vessel and a slurry of the modified catalyst in the diluent is formed and aged which catalyst slurry is directly used in the polymerization process.

5. The process of claim 1 wherein during preparation of the catalyst the preparation of the slurry of modified alkaline earth hexammine in liquid ammonia is conducted in a continuous manner and comprises continually feeding alkaline earth metal and liquid ammonia, continuously feeding the alkylene oxide and the organic nitrile and continuously transferring the slurry of modified alkaline earth hexammine in liquid ammonia to the stripper vessel.

6. The process of claim 1 wherein the catalyst is obtained by a preparation process comprising:
    (1a) continually feeding a predetermined amount of alkaline earth metal into a dissolver vessel comprising liquid ammonia and
    (1b) continually adding liquid ammonia to form alkaline earth metal hexammine dissolved in liquid ammonia;
    (2a) continuously transferring the alkaline earth metal hexammine solution into a modifier vessel;
    (2b) continuously feeding the alkylene oxide and the organic nitrile into the modifier vessel to form a slurry of modified alkaline earth metal hexammine in liquid ammonia;
    (3a) continuously transferring the slurry of modified alkaline earth metal hexammine in liquid ammonia into the stripper vessel and
    (3b) continuously evaporating ammonia, thereby accumulating the modified catalyst in the stripper vessel;
    (4b) upon consumption of the alkaline earth metal gradually terminating all feeds and emptying the dissolver vessel via the modifier vessel into the stripper vessel; and
    (4c) aging the modified catalyst in the stripper vessel to obtain the final polymerization catalyst.

7. The process of claim 1 wherein the alkaline earth metal used in the preparation of the catalyst is calcium.

8. The process of claim 1 wherein the alkylene oxide used in the preparation of the catalyst is propylene oxide.

9. The process of claim 1 wherein the organic nitrile used in the preparation of the catalyst is acetonitrile.

10. The process of claim 1 wherein the catalyst is present in an amount corresponding to 0.0004 to 0.0040 g of alkaline earth metal per g of epoxide monomer.

11. The process of claim 1 wherein the catalyst is present in an amount corresponding to 0.0010 to 0.0017 g of alkaline earth metal per g of epoxide monomer.

* * * * *